United States Patent [19]
Coussediere et al.

[11] 3,876,637
[45] Apr. 8, 1975

[54] NOVEL Δ⁹- GONENE-11-ONES
[75] Inventors: Daniel Coussediere, Villejuif; Lucien Nedelec, Le Raincy; Vesperto Torelli, Maisons-Alfort, all of France
[73] Assignee: Roussel Uclaf, Paris, France
[22] Filed: Jan. 4, 1974
[21] Appl. No.: 430,769

[30] Foreign Application Priority Data
Jan. 5, 1973 France .............................. 73.00341

[52] U.S. Cl. ........................................ 260/239.55 C
[51] Int. Cl. ............................................. C07c 173/00
[58] Field of Search ..... /Machine Searched Steroids Primary Examiner—Henry A. French
Attorney, Agent, or Firm—Hammond & Littell

[57] ABSTRACT

Racemates and optically active isomers of novel Δ⁹-gonene-11-ones of the formula

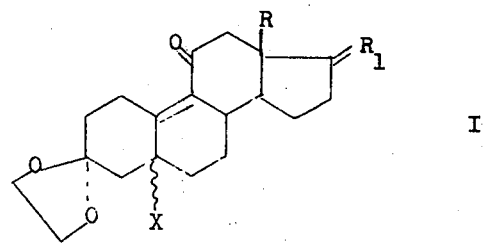

wherein R is alkyl of 1 to 3 carbon atoms, $R_1$ is selected from the group consisting of =O, ketals and

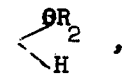

$R_2$ is selected from the group consisting of hydrogen and acyl of an organic carboxylic acid of 1 to 12 carbon atoms and X is selected from the group consisting of hydrogen and hydroxy which are valuable intermediates for the preparation of steroids such as adrenosterone.

24 Claims, No Drawings

NOVEL Δ⁹-GONENE-11-ONES

OBJECTS OF THE INVENTION

It is an object of the invention to provide the novel $\Delta^9$-gonene-11-ones of formula I.

It is another object of the invention to provide a novel process for the preparation of the $\Delta^9$-gonene-11-ones of formula I.

It is a further object of the invention to provide a novel process for producing valuable steroids from the compounds of formula I.

These and other objects and advantages of the invention will become obvious from the following detailed description.

THE INVENTION

The novel products of the invention are racemates and optically active isomers of $\Delta^9$-gonene-11-ones of the formula

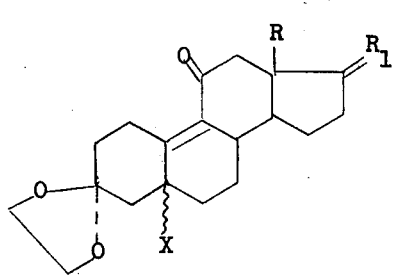   I wherein R is alkyl of 1 to 3 carbon atoms, $R_1$ is selected from the group consisting of =O, ketals and

$R_2$ is selected from the group consisting of hydrogen and acyl of an organic carboxylic acid of 1 to 12 carbon atoms and X is selected from the group consisting of hydrogen and hydroxy. The preferred compounds are the optically active isomers correspnding to the natural series.

Among the preferred substituents for R are lower alkyl such as methyl, ethyl and propyl and for $R_1$ are =O and ethylenedioxy or other lower alkylenedioxy groups and for $R_2$ are hydrogen or acyl of a saturated or unsaturated aliphatic carboxylic acid, and most preferably alkanoic acids.

Examples of suitable organic carboxylic acids of 1 to 12 carbon atoms are alkanoic acids such as formic acid, acetic acid, propionic acid, butyric acid, isobutyric acid or undecylic acid; cycloalkyl carboxylic acids and cycloalkylalkanoic acids such as cyclopropyl carboxylic acid, cyclopentyl carboxylic acid, cyclohexyl carboxylic acid, cyclopentylacetic or -propionic acids, or cyclohexylacetic or -propionic acids; aromatic acids such as benzoic acid; and phenylalkanoic acids such as phenylacetic acid or phenylpropionic acid.

Among the preferred compounds of formula I, X is hydrogen in the α- or β-position and R is methyl such as 3,3-ethylenedioxy-$\Delta^9$-5α-estrene-11,17-dione, 3,3-ethylene-dioxy-$\Delta^9$-5β-estrene-11,17-dione, 3,3,17,17-bis-(ethylene-dioxy)-$\Delta^9$-5α-estrene-11-one and 3,3,17,17-bis-(ethylene-dioxy)-$\Delta^9$-5β-estrene-11-one.

Also among the preferred compounds of formula I, X is hydroxy in the α- or β-position and R is methyl such as 3,3-ethylenedioxy-$\Delta^9$-estrene-5α-ol-11,17-dione, 3,3-ethylene-dioxy-$\Delta^9$-estrene-5β-ol-11,17-dione, 3,3,17,17-bis-(ethylene-dioxy)-$\Delta^9$-estrene-5β-ol-11-one and 3,3,17,17,-bis-(ethylene-dioxy)-$\Delta^9$-estrene-5β-ol-11-one.

The novel process of the invention for the preparation of a compound of formula I comprises reacting a compound of the formula

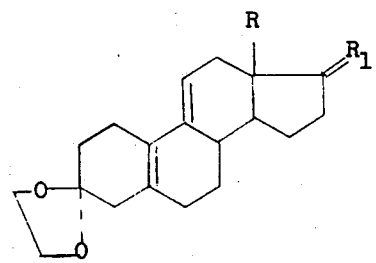   II with an epoxidation agent to obtain a compound of the formula

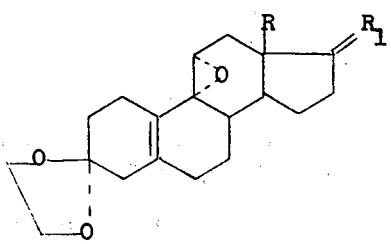   III reacting the latter with a Lewis acid to obtain a compound of the formula

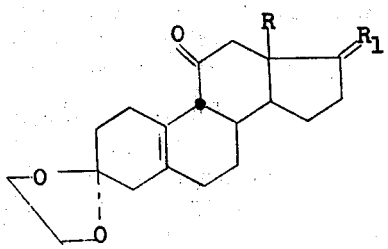   IV and reacting the latter either with an isomerization agent capable of causing the double bond in the 5(10) position to migrate to the 9(10) position and separating if desired the 5α-H and 5β-H isomers of the formula

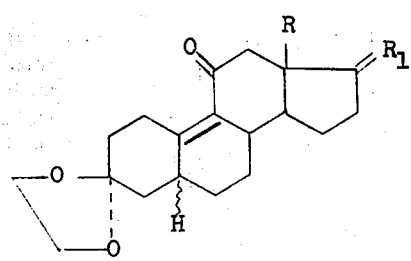   $I_1$ and when $R_1$ is keto reacting, if desired, the latter compound with a ketalization agent to form the corresponding 17-ketal compound or reacting the compound of formula IV with an epoxidation agent and separating, if desired, the isomers of the compound of the formula

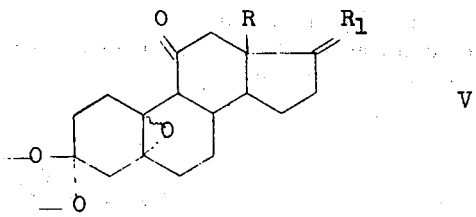

and subjecting the latter to the action of a strong base and separating, if desired, the isomers of the compounds of the formula

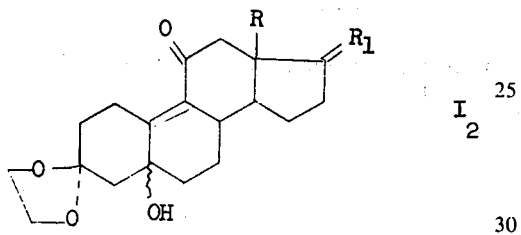

which may if desired be reacted with a ketalization agent when $R_1$ is oxygen to obtain the corresponding 17-ketal.

The compounds of formula II may be prepared by the method described in French Pat. Nos. 1,334,935 and 1,336,083.

The epoxidation agent for reaction with the compound of formula II may be an alkaline hydrogen peroxide solution in the presence of a nitrile or a peracid such as peracetic acid, perphthalic acid or m-chloroperbenzoic acid. The Lewis acid may be boron trifluoride, a complex of ethyl ether and boron trifluoride, aluminum chloride, stannic chloride, zinc chloride or ferric chloride.

The isomerization agent for the compound of formula IV may be potassium hydroxide in alcoholic media or alumina. The ketalization agent for the compounds of formula $I_1$ and $I_2$ is preferably ethylene glycol with the reaction being effected in the presence of an acid catalyst. However, the ketalization may also be effected by an exchange reaction with a dioxolane in the presence of an acid catalyst. Examples of dioxolanes are 2-methyl-2-ethyl-dioxolane, 2-methyl-2-phenyl-dioxolane, 2-methyl-4-(4'-methylbenzyl)-dioxolane, 2,2-dimethyl-4-(4'-methylbenzyl)-dioxolane, 2-chloromethyl-dioxolane, 2-β-chloroethyl-dioxolane or 2-methyl-2-isopropenyl-dioxolane.

The said acid catalyst may be a mineral acid such as hydrochloric acid, perchloric acid or sulfuric acid or a sulfonic acid such as p-toluene sulfonic acid or also boron trifluoride.

The epoxidation agent for the compound of formula IV is preferably peroxybenzimidic acid formed from hydrogen peroxide and benzonitrile, hydroperoxide of hexafluoroacetone or a peracid such as peracetic acid, perphthalic acid or m-chloroperbenzoic acid. The strong base is preferably potassium tert-butylate, sodium hydroxide, sodium amide potassium hydroxide or lithium acetylide with ethylene-diamine.

In a preferred mode of the process, the compound of formula II is epoxidized with hydrogen peroxide in the presence of a nitrile in an alkaline media, the Lewis acid is a complex of ethyl ether - boron trifluoride, the isomerizaton agent is alumina, the ketalization agent is 2-methyl-2-ethyl-dioxolane and the epoxidation agent is m-chloroperbenzoic acid or hydroperoxide of hexafluoroacetone.

The different optical isomers may be obtained in a suitable fashion using known processes such as chromatographic separation as indicated in the specific examples.

The invention particularly concerns a process with starting materials of formula II which are optical isomers of the natural series to produce compounds of formula I which are optical isomers of the natural series.

In a variation of the process of the invention, the compound of formula IV is reacted with an isomerization agent to obtain a compound of the formula

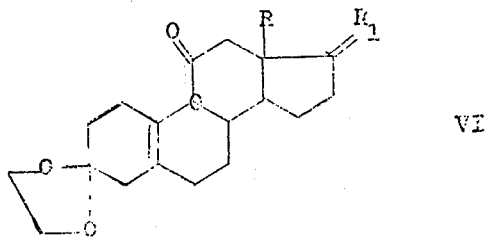

having a 9α-hydrogen and reacting the latter with an epoxidation agent to form a compound of the formula

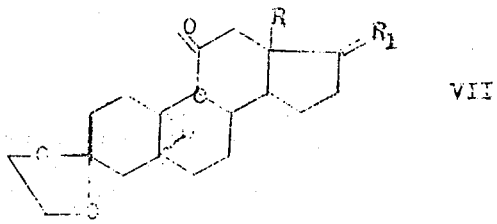

reacting the latter with an alkaline agent and, if desired, separated the isomers of a compound of the formula

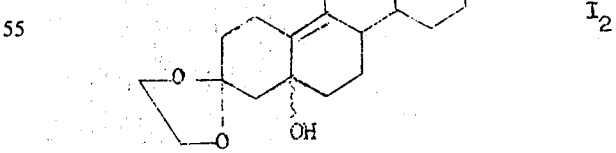

and when $R_1$ is =O, the product may be reacted with a ketalization agent to form the corresponding 17-ketal.

The isomerization agent may be, for example, potassium tert-butylate in toluene and the epoxidation and alkaline agents may be those discussed above.

In the preferred mode, the epoxidation agent is m-chloroperbenzoic acid and the alkaline agent is sodium hydroxide in ethanol. The isomers may be separated using the classical chromatographic methods.

The process of the invention for the preparation of 10-alkyl steroids from the compounds of formula I comprises reacting a compound of formula I in which $R_1$ is other than oxygen with an organomagnesium halide of the formula $$R_3Mg\ Hal$$

wherein $R_3$ is methyl, ethyl or propyl and Hal is chlorine, bromine or iodine, preferably in the presence of cuprous salts and then reacting with a functional derivative of an organic carboxylic acid of the formula Y—COOH wherein Y is alkyl of 1 to 4 carbon atoms optionally substituted with 1 or more halogen atoms to obtain a compound of the formula

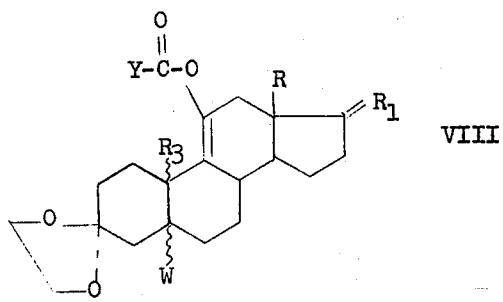

VIII wherein R, $R_3$, $R_1$ and Y have the above definition and W is selected from the group consisting of H and Y—COO— and reacting the latter with an acid agent to form a compound of the formula

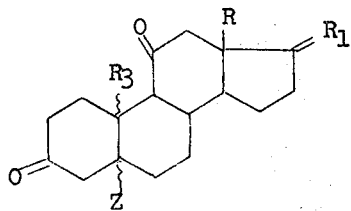

IX wherein R and $R_1$ have the above definitions and $R_1$ is other than a free ketal and Z is hydrogen or a $\Delta^{4(5)}$-double band.

The process of the invention concerns starting from a compound of formula I wherein X is a β-hydrogen to form a compound of formula VIII wherein W is a β-hydrogen and treating the latter compound with an acid agent and then a basic agent to obtain a compound of the formula

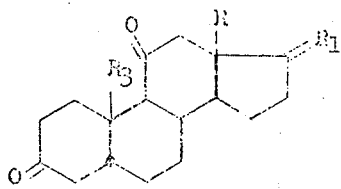

IX₁

The invention also concerns starting from a compound of formula I wherein X is β—OH to form a compound of formula VIII wherein W is Y—COO— in the β-position and treating the latter compound with an acid agent to obtain a compound of the formula

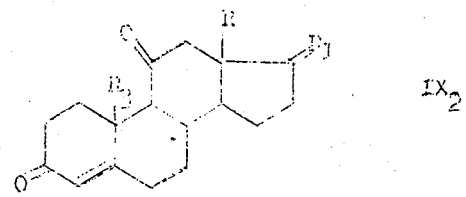

IX₂

The organomagnesium derivative is preferably methyl, ethyl or propyl magnesium chloride or bromide. The functional derivative of the acid Y—COOH is preferably the anhydride or acid chloride of acetic acid or propionic acid. The acid agent is preferably a mineral acid such as hydrochloric acid, sulfuric acid or perchloric acid.

The invention also concerns reating a compound of formula I wherein X is α-hydrogen and $R_1$ is other than =O with an organomagnesium halide of the formula $$R_3Mg\ Hal$$

preferably in the presence of cuprous salts to obtain a compound of the formula

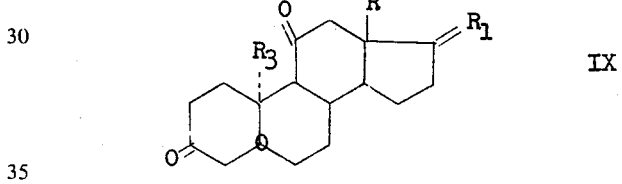

IX and if $R_1$ is a ketal, the product may be reacted with an acid agent to obtain the corresponding 17-keto compound.

The compounds of formula I have a ketone in the 11-position and are of the cortisone type which allows one to obtain by 1–4 addition through a conjugated ketone with a methyl magnesium halide intermediates useful for preparing cortisonic derivatives. In addition, this permits preparation of difficult to obtain products by hemisynthesis such as 10-iso compounds or those having a 10-alkyl other than methyl.

The compounds of formula I have a great industrial interest as the products of formula IX can be prepared from the compounds of formula I and these prove to be well known products such as adrenosterone, intermediates for synthesis of diverse steroids, particularly cortisonic steroids [Fieser & Fieser, (1959) p. 605–608].

In the following examples there are described several preferred embodiments to illustrate the invention. However, it should be understood that the invention is not intended to be limited to the specific embodiments.

EXAMPLE 1

3,3-Ethylenedioxy-$\Delta^9$-5α and 5β-Estrene-11,17-Dione

STEP A: 3,3-ethylenedioxy-9α,11α-epoxy-$\Delta^{5(10)}$-estrene-17-one 40 g of 3,3-ethylenedioxy-$\Delta^{5(10),9(11)}$-estradiene-17-one (prepared in French Pat. No. 1,336,083) were added to a solution containing 1200 ml of acetone, 120 ml of water, 36 ml of benzonitrile and 94 ml of 110 volumes of hydrogen peroxide and then 16 g of sodium bicarbonate and 160 ml of water were added thereto. The mixture was stirred for 24 hours and 45 ml of 110 volumes of hydrogen peroxide were added thereto. The mixture was then kept at room temperature for 24 hours and 800 ml of acetone were distilled off under reduced pressure while the same amount of water was added. After standing at room temperature, the reaction mixture was vacuum filtered and the recovered precipitate was washed to obtain 35.3 g. of 3,-3-ethylenedioxy-9α,11α-epoxy-Δ$^{5(10)}$-estrene-17-one melting at 218°C and having a specific rotation $[α]_D^{20} = +223° ± 4°$ (c=0.68% in chloroform).

STEP B: 3,3-ethylenedioxy-Δ$^{5(10)}$-9β-estrene-11,17-dione 1.65 g of 3,3-ethylenedioxy-9α,11α-epoxy-Δ$^{5(10)}$-estrene-17-one were added to a solution of 500 ml of ether and 0.7 ml of boron trifluoride etherate and then 50 ml of sodium bicarbonate solution were added. The mixture was decanted and the solid was washed to obtain 1.57 g of a product which was crystallized to obtain 3,3-ethylenedioxy -Δ$^{5(10)}$-9β-estrene-11,17-dione melting at 161°C and having a specific rotation $[α]_D^{20} = +221° ± 3°$ (c=0.91% in chloroform).

STEP C: 3,3-ethylenedioxy-Δ$^9$-5α-estrene,11,17-dione and 3,3-ethylenedioxy-Δ$^9$-5β-estrene-11,17-dione 11.36 g of 3,3-ethylenedioxy-Δ$^{5(10)}$-9β-estrene-11,17-dione were added to 25 ml of a 1-1 benzene-chloroform mixture and the resulting mixture was fixed with a column of 1 Kg of Merck alumina. Then, a liter of a 1—1 benzene-methylene chloride mixture was run through the column and they remained in contact for 74 hours at room temperature in the dark. The column was eluted with a 1—1 mixture of ethylacetate and methylene chloride and the eluate was evaporated to dryness under reduced pressure to obtain 9.67 of product. The said product was chromatographed over silica with elution with a 1–3 mixture of essence B solvent and ether to obtain 1.4 g of 3,3-ethylenedioxy-Δ$^9$-5α-estrene-11,17-dione melting at 152°C and having a specific rotation $[α]_D^{20} = +18.5 ± 2°$ (c=0.5% in chloroform) and 750 mg of 3,3-ethylenedioxy-Δ$^9$-5β-estrene-11,17-dione melting at 200°C and having a specific rotation $[α]_D^{20} = +85.5° ± 1.5°$ (c=0.99% in chloroform).

300 mg of 3,3-ethylenedioxy-Δ$^9$-5β-estrene-11,17-dione were added to a solution of 3 ml of methyl ethyl dioxolane, 0.06 ml of glycol and 9 mg of p-toluene sulfonic acid and the suspension was kept for 24 hours at room temperature. A solution of sodium bicarbonate was then added and the mixture was extracted with benzene to obtain 320 mg of product. The product was chromatographed over silica and was eluted with a 3–1 mixture of ether and essence B solvent to obtain 280 mg of 3,3,17,17-bis-(ethylenedioxy)-Δ$^9$-5β-estrene-11-one melting at 139°C.

EXAMPLE 3

3,3,17,17-bis(ethylenedioxy)-Δ$^9$-5α-estrene-11-one

Using the procedure of Example 2, 3,3-ethylenedioxy-Δ$^9$-5α-estrene-11,17-dione was reacted to obtain 3,3,17,17-bis-(ethylenedioxy)-Δ$^9$-5α-estrene-11-one melting at 197°C.

EXAMPLE 4

3,3-ethylenedioxy-Δ$^9$-estrene-5α-ol-11,17-dione and 3,3-ethylenedioxy-Δ$^9$-estrene-5β-ol-11,17-dione

STEP A:

13 g of 3,3-ethylenedioxy-Δ$^{5(10)}$-9β-estrene-11,17-dione were added at 10°C to a solution of 200 ml of methylene chloride and 8 g of m-chlorobenzoic acid and the resulting misture was washed with sodium bicarbonate solution and was extracted and washed to obtain 13 g of product. The said product was chromatographed over silica with elution with a 90–10–1 mixture of ether-essence β-triethylamine to obtain 12 g of epoxidied product which was used as is for the next step.

STEP B:

12 g of the product of Step A were dissolved under nitrogen in 30 ml of ethanol and 10 ml of 1N sodium hydroxide solution and the reaction mixture was heated at 45°–50°C for 1 hour. The mixture was then cooled to room temperature, diluted with water and extracted with ethyl acetate to obtain a product which was chromatographed several times over silica with ether as eluant to obtain 3.4 g of 3,3-ethylenedioxy-Δ$^9$-estrene-5α-ol-11,17-dione melting at 225°C and having a specific rotation $[α]_D^{20} = -37° ± 2°$ (c=0.5% in chloroform) and 4.2 g of 3,3-ethylenedioxy-Δ$^9$-estrene-5β-ol-11,17-dione melting at 197°C and having a specific rotation $[α]_D^{20} = +203.5° ± 4°$ (c=0.5% in chloroform).

EXAMPLE 5

3,3-ethylenedioxy-Δ$^9$-estrene-5α-ol-11,17-dione and 3,3-ethylenedioxy-Δ$^9$-estrene-5α-ol-11,17-dione STEP A: 3,3-ethylenedioxy-Δ$^{5(10)}$-estrene-11,17-dione A stream of nitrogen was bubbled through a mixture of 5 g of potassium tert.-butylate in 250 ml of toluene with stirring and then 5 g of 3,3-ethylenedioxy-Δ$^{5(10)}$-9β-estrene-11,17-dione were added thereto. The mixture was stirred for 1 hour with continued stirring and nitrogen bubbling and 2.6 g of acetic acid were added. The mixture was diluted with benzene and washed to obtain 5.4 g of a product which was chromatographed over silica with elution with a 1–3 mixture of essence B-ether to obtain after crystallization 3,3-ethylenedioxy-Δ$^{5(10)}$-estrene-11,17-dione melting at 130°C and having a specific rotation $[α]_D^{20} = +298° ± 4.5°$ (c=0.5% in chloroform).

STEP B: 3,3-ethylenedioxy-Δ$^9$-estrene-5α-ol-11,17-dione 390 mg of 3,3-ethylenedioxy-Δ$^{5(10)}$-estrene-11,17-dione were added with stirring and a nitrogen current to 6 ml of methylene chloride and then 240 mg of m-chloro-perbenzoic acid were added. The mixture was stirred for 1 hour at 0°C and was vacuum filtered. The precipitate was washed with methylene chloride to obtain 450 mg of product which was dissolved in 2 ml of ethanol and 0.6 ml of 1N sodium hydroxide solution. The mixture was refluxed at 80°C, cooled to room temperature, diluted with water and extracted to obtain 370 mg of product. The product was chromatographed over silica with ether as eluant to obtain 50 mg of 3,3-ethylenedioxy-Δ$^9$-estrene-5α-ol-11,17-dione melting at 222°C and 232 mg of 3,3-ethylenedioxy-Δ$^9$-estrene-5β-ol-11,17-dione melting at 197°C.

EXAMPLE 6

3,3,17,17-bis-(ethylenedioxy)-$\Delta^9$-estrene-5$\beta$-ol-11-one

Using the procedure of Example 2, 3,3-ethylenedioxy-$\Delta^9$-estrene-5$\beta$-ol-11,17-dione was reacted to obtain 3,3,17,17-bis-(ethylenedioxy)-$\Delta^9$-estrene-5$\beta$-ol-11-one.

| U.V. Spectrum (ethanol): | | |
|---|---|---|
| Max at 248–249 mn | $E_{1cm}^{1\%} = 186$ | $\epsilon = 7.300$ |
| Inflex. towards 305 mn | $E_{1cm}^{1\%} = 4$ | |

EXAMPLE 7

3,3,17,17-bis-(ethylenedioxy)-$\Delta^9$-estrene-5$\alpha$-ol-11-one

Using the procedure of Example 2, 3,3-ethylenedioxy-$\Delta^9$-estrene-5$\alpha$-ol-11,17-dione was reacted to obtain 3,3,17,17-bis-(ethylenedioxy)-$\Delta^9$-estrene-5$\alpha$-ol-11-one melting at 190°C.

EXAMPLE 8

5$\beta$-androstane-3,11,17-trione

STEP A: 3,3,17,17-bis-(ethylenedioxy)-11-acetoxy-$\Delta^{9(11)}$-5$\beta$-androstene 1 ml of a solution of methyl magnesium bromide in tetrahydrofuran (titrating 1.45 M) was added with stirring under nitrogen to a suspension of 1 ml of tetrahydrofuran and 8 mg of cuprous chloride and after cooling the suspension to 0°C, 30 mg of 3,3,17,17-bis-(ethylenedioxy)-$\Delta^9$-5$\beta$-estrene-11-one and 1 ml of tetrahydrofuran were added. The mixture was stirred for 2 hours at 0°C and then 0.5 ml of acetic acid anhydride was added thereto. A solution of ammonium chloride was added thereto and the mixture was extracted with methylene chloride to obtain 90 mg of product. The product was chromatographed over silica with a 3-1 ether-essence B mixture as eluant to obtain 35 mg of 3,3,17,17-bis-(ethylenedioxy)-11-acetoxy-$\Delta^{9(11)}$-androstene melting at 174°C.

STEP B: 5$\beta$-androstane-3,11,17-trione

A few drops of pure hydrochloric acid were added to a solution of 28 mg of 3,3,17,17-bis-(ethylenedioxy)-11-acetoxy-$\Delta^{9(11)}$-5$\beta$-androstene in 0.5 ml of acetone and the mixture was refluxed. The mixture was cooled to room temperature, diluted with water and extracted. The product was dissolved in 0.5 ml of ethanol and 2 drops of 2N sodium hydroxide solution were added thereto. The mixture was heated to reflux and cooled to room temperature, diluted and extracted to obtain 10 mg of 5$\beta$-androstane-3,11,17-trione melting at 130°C.

EXAMPLE 9

10$\alpha$,5$\alpha$-androstane-3,11,17-trione

STEP A: 3,3,17,17-bis-(ethylenedioxy)-10$\alpha$,5$\alpha$-androstane-11-one 12 mg of cuprous chloride were added to 2.43 ml of methyl magnesium bromide in tetrahydrofuran (titrating 1.44 M) and 1.7 ml of tetrahydrofuran were added thereto. The mixture was cooled to −4°C and 262 mg of 3,3,17,17-bis-(ethylenedioxy)-$\Delta^9$-5$\alpha$-estrene-11-one were added thereto after which the mixture was stirred at 0° to 2°C for 6 hours. An ammonium chloride solution was added thereto under a nitrogen atmosphere and the mixture stood overnight under the nitrogen atmosphere. The mixture was diluted with benzene and washed with water to obtain 280 mg of product which was chromatographed over silica to obtain 225 mg of 3,3,17,17-bis-(ethylenedioxy)-10$\alpha$,5$\alpha$-androstane-11-one melting at 180°C and having a specific rotation $[\alpha]_D^{20} = -9 \pm 2°$ (c=0.45% in chloroform) Rf = 0.45.

STEP B: 10$\alpha$,5$\alpha$-androstane-3,11,17-trione 40 mg of the product of Step A were added with stirring under a nitrogen atmosphere to a solution of 1 ml of acetone and 0.2 ml of 2N hydrochloric acid and then 0.2 ml of 2N hydrochloric acid was added twice. The reaction ended and the acetone was removed. The mixture was diluted with water and was vacuum filtered. The recovered precipitate was washed and dried to obtain 27 mg of 10$\alpha$,5$\alpha$-androstane-3,11,17-trione melting at 185°C.

EXAMPLE 10

Androsterone

STEP A: 3,3,17,17-bis-(ethylenedioxy)-5,11-diacetoxy-$\Delta^{9(11)}$-5$\beta$-androstene 6 ml of a solution of methyl magnesium bromide in tetrahydrofuran (titrating 1.45 M) were added at 0°C under a nitrogen atmosphere to a suspension of 6 ml of tetrahydrofuran and 50 mg of cuprous chloride and then 330 mg of 3,3,17,17-bis-(ethylenedioxy)-$\Delta^9$-estrene-5$\beta$-ol-11-one and 6 ml of tetrahydrofuran were added thereto. After the addition of 3 ml of acetic anhydride, a solution of sodium bicarbonate was added thereto and the mixture was extracted with ethyl acetate and washed with water to obtain 0.600 g of product. The product was chromatographed over silica using a 3-1 mixture of ether-essence B as eluant to obtain 355 mg of 3,3,17,17-bis-(ethylenedioxy)-5,11-diacetoxy-$\Delta^{9(11)}$-5$\beta$-androstene.

IR Spectrum (chloroform):
5-acetoxy at $1727^{cm-1}$ and enolic acetate in the 11-position with carboxyl at $1748^{cm-1}$ and C=C at $1044^{cm-1}$.

STEP B: Adrenosterone 33 mg of 3,3,17,17-bis-(ethylenedioxy)-5,11-diacetoxy-$\Delta^{9(11)}$-5$\beta$-androstene were added with stirring under a nitrogen atmosphere to a solution of 0.3 ml of ethanol and 2 drops of hydrochloric acid and the mixture was refluxed for 30 minutes and then cooled to room temperature. Water was added thereto and the mixture was vacuum filtered. The recovered precipitate was washed to obtain 16 mg of adrenosterone melting at 222°C and having a specific rotation $[\alpha]_D^{20} = +270.5° \pm 4.5°$ (c=0.6% in acetone).

Various modification of the process and products of the invention may be made without departing from the spirit or scope thereof and it is to be understood that the invention is to be limited only as defined in the appended claims.

We claim:

1. A compound selected from the group consisting of racemates and optically active isomers of $\Delta^9$-gonene-11-ones of the formula wherein R is alkyl of 1 to 3 carbon atoms, R₁ is selected from the group consisting of =O ketals and

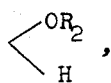

R₂ is selected from the group consisting of hydrogen and acyl of an organic carboxylic acid of 1 to 12 carbon atoms and X is selected from the group consisting of hydrogen and hydroxy.

2. A compound of claim 1 wherein X is hydrogen.
3. A compound of claim 2 wherein R is methyl.
4. A compound of claim 3 which is 3,3-ethylenedioxy-Δ⁹-5α-11,17-dione.
5. A compound of claim 3 which is 3,3-ethylenedioxy-Δ⁹-5β-estrene-11,17-dione.
6. A compound of claim 3 which is 3,3,17,17-bis-(ethylenedioxy)-Δ⁹-5α-estrene-11-one
7. A compound of claim 3 which is 3,3,17,17-bis-(ethylenedioxy)-Δ⁹-5β-estrene-11-one.
8. A compound of claim 1 wherein X is —OH.
9. A compound of claim 8 wherein R is methyl.
10. A compound of claim 9 which is 3,3-ethylenedioxy-Δ⁹-estrene-5α-ol-11,17-dione.
11. A compound of claim 9 which is 3,3-ethylenedioxy-Δ⁹-estrene-5β-ol-11,17-dione.
12. A compound of claim 9 which is 3,3,17,17-bis-(ethylenedioxy)-Δ⁹-estrene-5α-ol-11-one.
13. A compound of claim 9 which is 3,3,17,17-bis-(ethylenedioxy)-Δ⁹-estrene-5β-ol-11-one.
14. A compound of claim 1 in the form of the optically active isomer of the natural series.
15. A process for the production of a compound of claim 1 wherein R₁ is other than a ketal and X is hydrogen which comprises reacting a compound of the formula

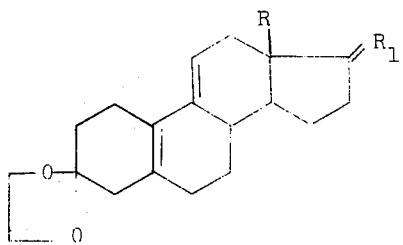

with an epoxidation agent selected from the group consisting of alkaline hydrogen peroxide in the presence of a nitrile and a peracid to obtain a compound of the formula

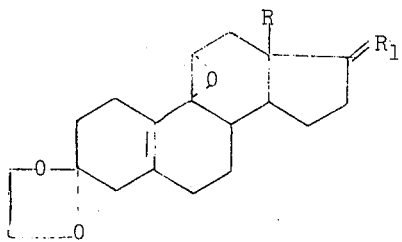

reacting the latter with a Lewis acid to obtain a compound of the formula

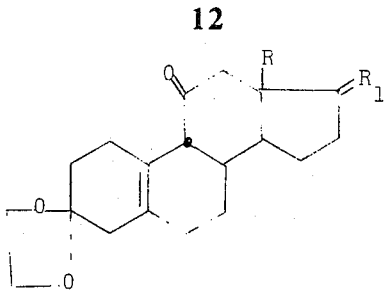

and reacting the latter with an isomerization agent capable of causing the double bond in the 5(10) position to migrate to the 9(10) position selected from the group consisting of alumina and alkali metal hydroxide in an alcoholic media and separating if desired the 5α-H and 5β-H isomers of the formula

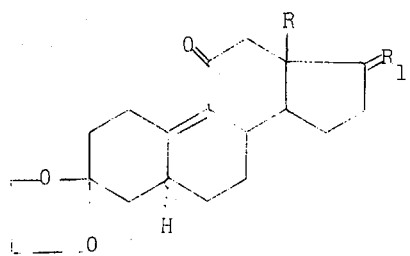

16. The process of claim 15 wherein the product is reacted with a ketalizing agent selected from the group consisting of ethylene glycol and a dioxolane to form the corresponding ketal.

17. A process for the preparation of a compound of claim 1 wherein X is OH and R₁ is other than a ketal which comprises reacting a compound of the formula

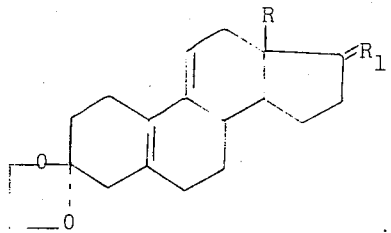

with an epoxidation agent selected from the group consisting of alkaline hydrogen peroxide in the presence of a nitrile and a peracid to form a compound of the formula

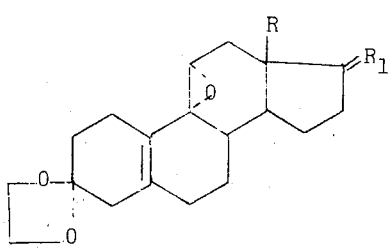

reacting the latter with a Lewis acid to form a compound of the formula

13

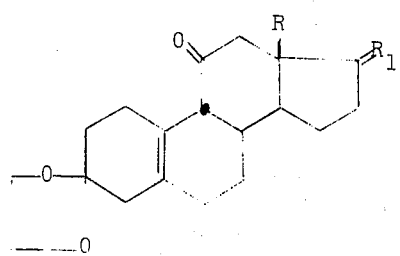

reacting the latter with an epoxidation agent selected from the group consisting of alkaline hydrogen peroxide in the presence of a nitrile and a peracid and separating, if desired, the isomers of a compound of the formula

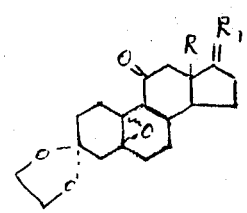

and subjecting the latter to a strong base and separating, if desired, the isomers of the compound of the formula

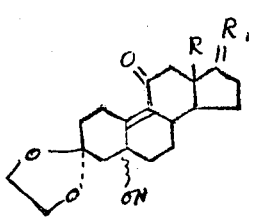

18. The process of claim 17 wherein the product is reacted with a ketalizing agent selected from the group consisting of ethylene glycol and a dioxolane to form the corresponding 17-ketal.

19. A process for the preparation of a compound of claim 1 wherein X is OH and $R_1$ is other than a ketal which comprises reacting a compound of the formula

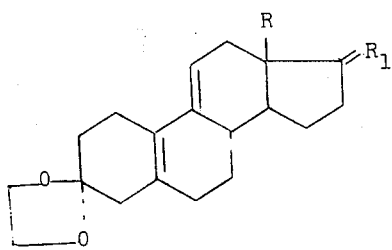

with an epoxidation agent selected from the group consisting of alkaline hydrogen peroxide in the presence of a nitrile and a peracid to form a compound of the formula

14

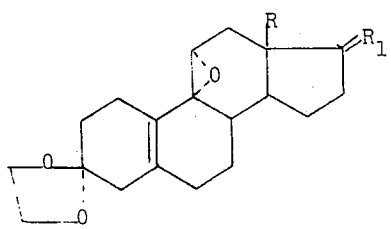

reacting the latter with a Lewis acid to form a compound of the formula

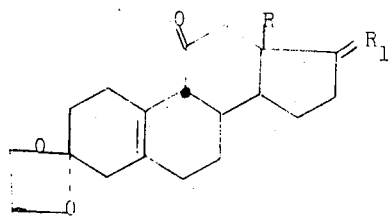

reacting the latter with an isomerization agent selected from the group consisting of alumina and an alkali metal hydroxide in an alcoholic media to form a 9α-H compound of the formula

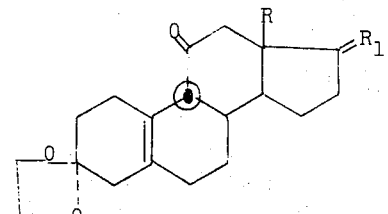

reacting the latter with an epoxidation agent selected from the group consisting of alkaline hydrogen peroxide in the presence of a nitrile and a peracid to form a compound of the formula

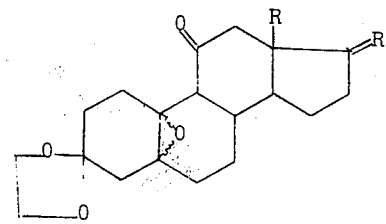

reacting the latter with an alkaline agent and separating, if desired, the isomers of the compound of the formula

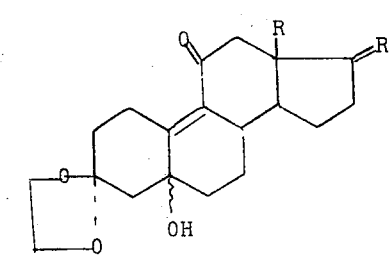

wherein $R_1$ is other than a ketal.

20. The process of claim 19 wherein $R_1$ is oxygen and the product is reacted with a ketalization agent selected from the group consisting of ethylene glycol and a dioxolane to form the corresponding ketal.

21. A process for the preparation of a compound of the formula

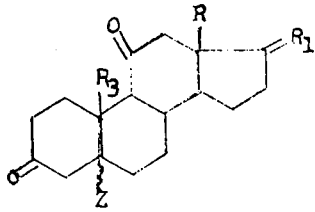

wherein R is alkyl of 1 to 3 carbon atoms, $R_1$ is selected from the group consisting of =O and

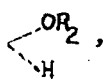

$R_2$ is selected from the group consisting of hydrogen and acyl of an organic carboxylic acid of 1 to 12 carbon atoms, $R_3$ is selected from the group consisting of methyl, ethyl and propyl and Z is selected from the group consisting of hydrogen and a $\Delta^{4(5)}$-double band which comprises reacting a compound of claim 1 wherein $R_1$ is other than =O with an organo magnesium halide of the formula $R_3$Mg Hal wherein $R_3$ is methyl, ethyl or propyl and Hal is chlorine, bromine or iodine, preferably in the presence of cuprous salts and then reacting with a functional derivative of an organic carboxylic acid of the formula Y—COOH wherein Y is alkyl of 1 to 4 carbon atoms optionally substituted with 1 or more halogen atoms to obtain a compound of the formula

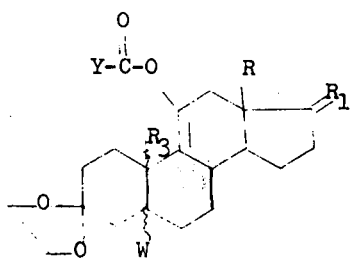

wherein R, $R_3$, $R_1$ and Y have the above definition and W is selected from the group consisting of H and Y—COO— and reacting the latter with an acid agent to form the desired compound.

22. A process for the preparation of a compound of the formula

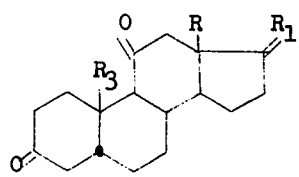

wherein R is alkyl of 1 to 3 carbon atoms, $R_1$ is selected from the group consisting of =O, ketal and

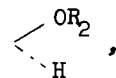

$R_2$ is selected from the group consisting of hydrogen and acyl of an organic carboxylic acid of 1 to 12 carbon atoms and $R_3$ is selected from the group consisting of methyl, ethyl and propyl comprising reacting a compound of claim 1 wherein X is a $\beta$-hydrogen with an organo magnesium halide of the formula $R_3$Mg Hal wherein Hal is chlorine, bromine or iodine, preferably in the presence of cuprous salts, and then with a functional derivative of an organic carboxylic acid of the formula Y—COOH wherein Y is alkyl of 1 to 4 carbon atoms optionally substituted with at least one halogen to obtain a compound of the formula

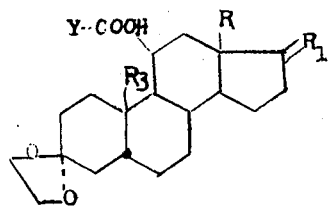

reacting the latter with an acid agent and then a basic agent to obtain the desired compound.

23. The process of claim 21 wherein X is a $\beta$-OH and W is

in the $\beta$-position and the compound of the formula

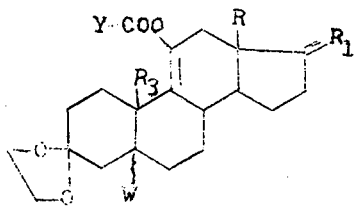

is reacted with an acid agent to obtain a compound of the formula

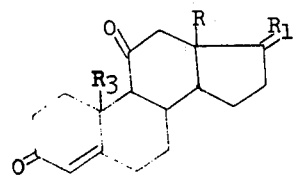

24. The process of claim 21 wherein a compound of claim 1 wherein X is a $\alpha$-hydrogen and $R_1$ is other than =O is reacted with $R_3$ Mg Hal to obtain a compound of the formula

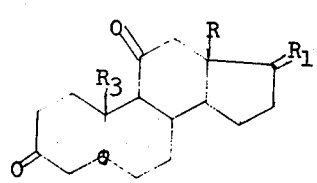

* * * * *